June 17, 1958  H. F. DALGLISH  2,839,737
REMOTE CONTROL TELEMETERING UNIT
Filed May 14, 1954  4 Sheets-Sheet 1

INVENTOR
Herbert F. Dalglish
BY Robert M. Dunning
ATTORNEY

June 17, 1958     H. F. DALGLISH     2,839,737
REMOTE CONTROL TELEMETERING UNIT
Filed May 14, 1954     4 Sheets-Sheet 2

INVENTOR.
Herbert F. Dalglish
BY Robert M. Dunning
ATTY.

June 17, 1958 — H. F. DALGLISH — 2,839,737
REMOTE CONTROL TELEMETERING UNIT
Filed May 14, 1954 — 4 Sheets-Sheet 3

INVENTOR
Herbert F. Dalglish
BY
ATTORNEY

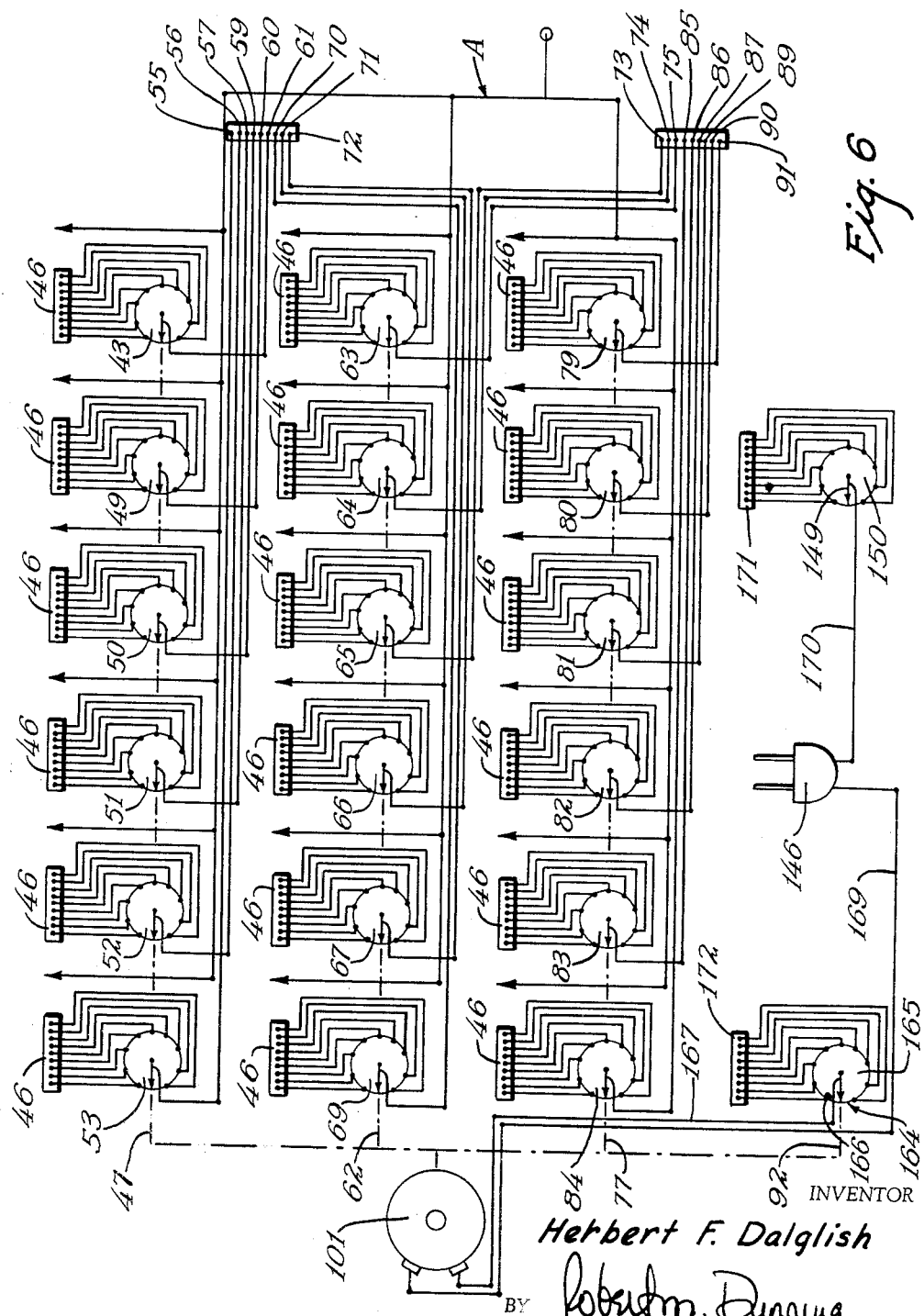

United States Patent Office 2,839,737
Patented June 17, 1958

2,839,737

REMOTE CONTROL TELEMETERING UNIT

Herbert F. Dalglish, St. Paul, Minn.

Application May 14, 1954, Serial No. 429,863

9 Claims. (Cl. 340—150)

This invention relates to remote control units and deals particularly with a means for connecting any of a considerable number of thermocouple circuits with a selector unit which is located in a central station.

Devices have been produced for indicating temperatures in bins of grain or various other hydrocarbon materials. As an example, grain elevators usually include a considerable number of storage bins which are of considerable depth. Thermocouple circuits usually are provided extending vertically in these bins and connected to a suitable instrument for determining temperature. As these circuits usually are provided with thermocouples located at intervals of from five to fifteen feet for example, the circuit necessarily includes a considerable number of wires.

In order that all of the thermocouple circuits may be read at a single central station it would ordinarily be necessary to continue each of the cables by suitable conductors leading from the thermocouple circuit to the central station. In many instances each thermocouple circuit includes about twenty conductors and in many installations there are from fifty to perhaps several hundred such circuits in a complete installation. This would ordinarily require a maze of wires leading from one individual thermocouple circuit to the central station and would result in tremendous cost. Furthermore, the weight of the cables and size of cable necessary to connect with a substantial number of thermocouple units makes such an arrangement ponderous and complicated.

An object of the present invention lies in the provision of a remote control system which select the thermocouple circuits and which, therefore, considerably reduces the number of wires which must be employed in the system which greatly reduces the complexity of the wiring of such a system.

An added feature of the present invention resides in the provision of a remote control system which is capable of producing an indication of temperature conditions at any thermocouple junction of any thermocouple system of a plurality of such systems. By proper operation the control unit may be set to connect the indicator with any of a large number of thermocouple circuits and also to connect any thermocouple junction to the indicating means so as to determine the temperature at the junction.

A further feature of the present invention lies in the provision of a system capable of connecting any thermocouple junction of a considerable number of said junctions to an indicator. Any such selection may be made at the selector unit by properly arranging the controls thereon.

A further feature of the present invention lies in the provision of a control unit which includes a selector unit and a remote control unit, the latter of which includes a motor capable of driving a switch element capable of connecting a common conductor with any of a series of conductors. Means are provided for controlling the operation of this motor so that any desired conductor may be connected in the series. For the purpose of simplifying the description, the part of the apparatus located at the central station is described as a "selector unit" and the other portions are described as "remote control units." Actually, however, both units could be described as selector units, as the thermocouple circuits are actually selected by operation of the remote control unit. In order to distinguish between these units, the terminology above referred to has been employed.

In the following description, a motor has been described for driving the switches of the remote control unit. This motor may be of any desired type for advancing the switch arms from one position to another, and may comprise a rotary motor, or an impulse operated device such as a solenoid driven apparatus.

An added feature of the present invention lies in the provision of a remote control system useful in conjunction with thermocouple circuits which include a common wire of one material and a series of wires of a second material connected to the common wire at desired intervals. Thus, the unit is capable of greatly reducing the number of conductors which would ordinarily be required to connect the common wire and other wires to the central control station.

These and other objects and novel features of my invention will be more clearly and fully set forth in the following specification and claims.

In the drawings forming a part of the specification:

Figure 3 is a diagrammatic view of an individual thermocouple circuit, all of the circuits being substantially similar.

Figure 6 is a diagrammatic view somewhat similar to Figure 2 but showing a slightly modified circuit arrangement.

Figure 1:
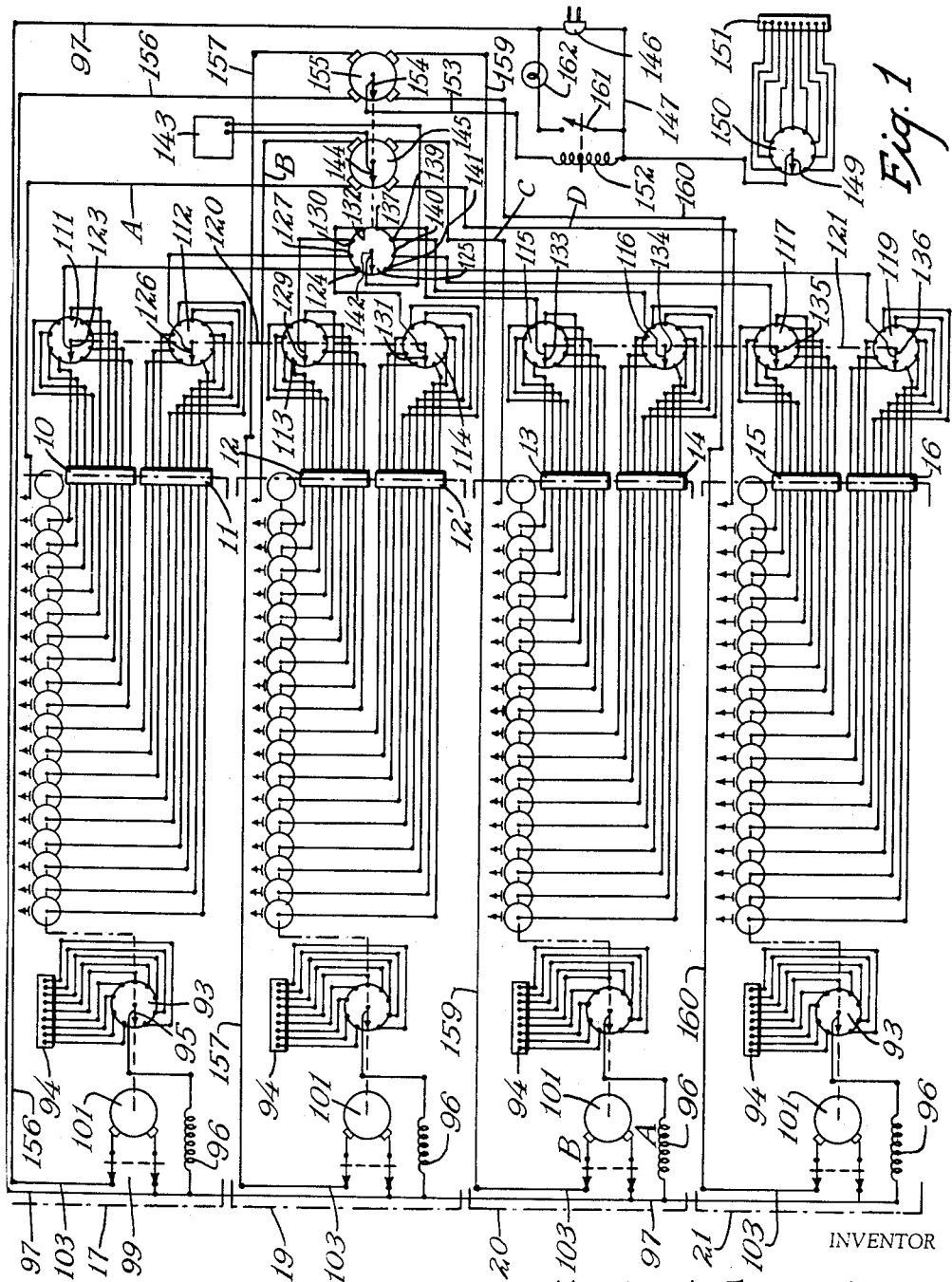
Figure 1 is a diagrammatic view of the system, the thermocouple circuits not being shown in detail.

In Figure 1 the selector unit has been indicated to the right of a series of terminal strips, these terminal strips being indicated by the numerals 10, 11, 12, 12', 13, 14, 15 and 16, respectively. The structure to the right of these terminal strips in Figure 1 comprises the selector unit while the portion to the left of the terminal strips is divided into four identical remote control units 17, 19, 20 and 21. It is believed obvious that a considerably greater number of remote control stations could be provided for, being shown as representative of such an arrangement.

Figure 3:
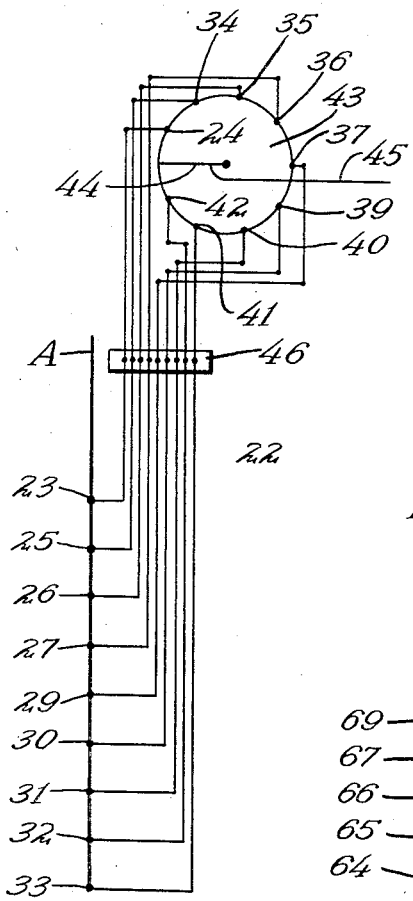

In usual practice thermocouple circuits are usually employed which include perhaps eighteen to twenty thermocouple junctions. In order to make the system practical to illustrate, the number of thermocouple junctions of each such circuit has been reduced to nine. Similarly, each of the various rotary switches which will be described usually control eighteen to twenty connected circuits. For the purpose of simplification this number has also been reduced to one-half. Obviously, the number of circuits connected to a rotary switch is a matter of choice. Figure 3 shows a typical thermocouple circuit including a common conductor A which is formed of one material such as Constantan. This common wire A is connected to wires 22 of a second material such as copper. The wires are usualy protected by a coating of insulation and the individual wires 22 are connected at substantially fixed intervals along the length of the common wire A. In the particular arrangement illustrated the junction 23 between one wire 22 and the common wire A is connected to a first switch terminal 24. The successive junctions 25, 26, 27, 29, 30, 31, 32 and 33 are connected to the successive switch terminals 34, 35, 36, 37, 39, 40, 41 and 42.

The rotary switch 43 is provided with a rotary switch arm 44 which may contact each of the switch contacts successively upon rotation of the arm 44 relative to the first mentioned contacts. The arm 44 is connected to a conductor 45 which leads to one of the terminal strips 10 through 16. As each of the remote control units are similar and one such unit is shown in enlarged form in Figure 2 reference is made to this figure. The common wire A leading to all of the thermocouple circuits is shown at the right of this figure, it being understood that one such wire A is included in each of the thermocouple circuits disclosed and all of these common wires A are electrically connected. The conductors leading to the thermocouple junctions are shown as terminating in terminal strips 46. In order to illustrate the location of the terminal strips relative to the thermocouple junctions, one such terminal strip is indicated at 46 in Figure 3. With reference again to Figure 2 of the drawings it will be noted that six rotary switches are shown in the upper row and are normally mounted upon the common shaft 47. While all of the rotary switches are identical, they are indicated at 43, 49, 50, 51, 52 and 53 for the purpose of illustration. The rotary arms 44 of these switches are relatively connected by suitable conductors similar to 45 to terminals on a terminal strip 54. As there are six such switch arms in the upper bank of switches these arms are connected to the top six terminals of the terminal strip 54. These terminals are indicated at 55, 56, 57, 59, 60 and 61.

A second series of rotary switches are connected to a second shaft 62, there being six such switches illustrated and the switches being identified by the numerals 63, 64, 65, 66, 67 and 69. The switch arms 44 of these rotary switches are connected by suitable conductors to terminal strips. The first three switches 63, 64 and 65 are connected to terminals 70, 71 and 72 of the terminal strip 54. The second three switches 66, 67 and 69 are connected to terminals 73, 74 and 75, respectively, of a second terminal strip 76. A third shaft 77 also supports and controls six rotary switches which are identified by the numerals 79, 80, 81, 82, 83 and 84. The rotary arms 44 of these switches are connected by suitable conductors to successive terminals 85, 86, 87, 89, 90 and 91 of the terminal strip 76. A fourth shaft 92 is shown as supporting a single rotary switch 93 having a number of terminals equal to the number of thermocouple junctions in the various thermocouple circuits. As Figure 3 has indicated the thermocouple circuits as having a common wire A and nine junctions with this wire, the rotary switch 93 is likewise provided with nine terminals which are connected successively to nine terminals of a junction strip 94. The nine terminals of this junction strip are not identified by number but it should be understood that the terminals are connected with successive rotary switch terminals.

The common arm 95 of the rotary switch 93 is connected through an armature coil 96 to a power wire 97. A double pole, single throw relay switch 99 includes a switch arm 100 capable of connecting one terminal of the motor 101 to the power wire 97 and includes a second switch arm 102 which connects the other terminal of the motor 101 to the second power wire 103.

This completes the description of each single remote control unit. From the description it will be seen that there are eighteen rotary switches disclosed each of which is capable of closing a circuit to any of nine conductors leading to corresponding thermocouple junctions. However, instead of having the nine conductors from each thermocouple circuit extend to the central station, each rotary switch is connected thereto by a single conductor, thus materially reducing the number of wires necessary to accomplish the desired result. The only conductors leading from the remote control unit to the selector unit are the conductors connected to the terminal strips 54, 76 and 94 together with the common thermocouple wire A and the power lines 97 and 103.

Figure 4:
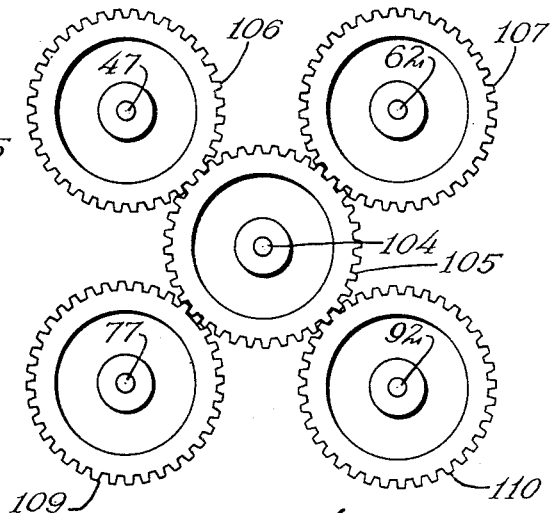
Figure 4 is a diagrammatic view showing a drive member and a series of driven members connected thereto for actuating the selector switches.
Figure 5:
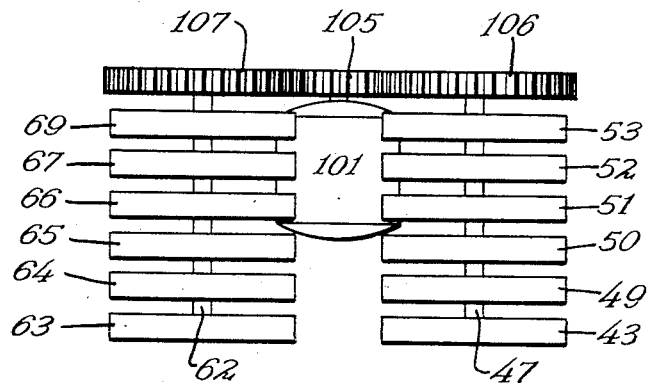
Figure 5 is a diagrammatic view showing a series of selector switches connected to each driven member which in turn are connected to a common drive member.

The operation of the remote control unit will be later described in detail. However, at the present time it is believed sufficient to state that the motor 101 drives simultaneously all of the rotary switches, the particular manner of operating the switches being indicated diagrammatically in Figures 4 and 5. The motor 101 drives a shaft 104 upon which is mounted a gear 105. The gear 105 is in mesh with gears 106, 107, 109 and 110, which are mounted upon the shafts 47, 62, 77 and 92, respectively. Figure 5 shows the rotary switches connected to the upper shafts 47 and 62 and their general arrangement in the unit.

It will be noted that in order to conserve space the rotary switches of each unit have been shown in Figure 1 as being supported upon a common shaft. The motor shaft and the shaft of the rotary switch 93 are offset from the combined shaft of the remaining switches for the purpose of simplification of the structure.

Having described the remote control unit, the selector unit will now be described. The selector unit includes a pair of rotary switches for each remote control unit, the switches 111 and 112 are useful in controlling the remote control unit 17. Similar rotary switches 113 and 114 are useful in controlling the remote control unit 19. A similar pair of switches 115 and 116 are used in controlling the remote control unit 20. Similar switches 117 and 119 are provided for controlling the remote control unit 21. All of these switches may be on a common shaft for rotation in unison or a predetermined number of such switches may be rotated at the same time. In the particular arrangement illustrated the switches 111, 112, 113 and 114 are shown mounted upon a shaft 120 and the remaining rotary switches 115, 116, 117 and 119 are shown as mounted upon a second shaft 121.

Each rotary switch is connected by suitable conductors to the terminals of a corresponding terminal strip, the rotary switch 111 having nine terminals which connect with the nine successive terminals of the contact strip 10 and the rotary switch 112 having nine successive contacts which connect with the successive terminals of terminal strip 11. In a similar manner the successive contacts of switch 113 are connected to successive terminals of terminal strip 12 and the successive terminals of rotary switch 114 are connected to corresponding terminals of the contact strip 12'. In the same manner the rotary switches 115, 116, 117 and 119 are provided with successive contacts which connect with successive terminals of the strips 13, 14, 15 and 16, respectively.

Thus it will be seen that upon rotation of the rotary switch 111, the switch arm thereof is connected to any of nine contacts which in turn are connected to the common arm 44 of nine rotary switches in the remote control unit. Similarly, all of the other rotary switches last described are useful in connecting a common switch arm to a corresponding rotary arm of a rotary switch in a remote control unit.

The switch arm 123 of switch 111 is connected to a first contact 124 of a rotary switch 125. The switch arm 126 of the rotating switch 112 is connected to a second contact 127 of the rotary switch 125. The arm 129 of the rotary switch 113 is connected to a third contact 130 of the rotary switch 125. Similarly, the arm 131 of the switch 114 is connected to the fourth terminal 132 of the switch 125. It will also be found that switches 115, 116, 117, and 119, are provided with rotary arms 133, 134, 135, and 136, which are connected to successive terminals 137, 139, 140, and 141, of the switch 125. Thus, the position of the rotary arm of switch 125 regulates which of the rotary switches 111 through 119 of the selector unit is in circuit.

The rotary arm 142 of switch 125 is connected to one terminal of an indicator 143 which measures the current flow and provides an indication of the temperature at a thermocouple terminal. The other terminal of the indicator 143 is connected to the rotary arm 144 of a rotary switch 145. The rotary switch 145 is provided with a first pair of terminals which are connected to the common Constantan thermocouple wire A leading to remote control unit 17. The switch 145 is connected with a second pair of terminals which are connected to the common wire B leading to the thermocouples of the second remote control unit 19.

In a similar manner the switch 145 is provided with a third pair of contacts which is connected to the conductor C which leads to or forms the common Constantan thermocouple wire of the third remote control unit 20. A fourth pair of contacts are connected to the conductor D which connects with or forms the Constantan common wire D of the fourth remote control unit 21.

The purpose of this arrangement is believed evident when it is understood that the switch 145 controls which of the remote control units is to be connected in series and as the switch 145 rotates in unison with the switch 125. The first two switches 111 and 112 of the selector unit are both connected with the first remote control unit 17 so there must be two successive positions on the switch 145 which lead to the common Constantan wire of the remote control unit 17. A similar situation is found with respect to the remaining remote control units.

Figure 2:
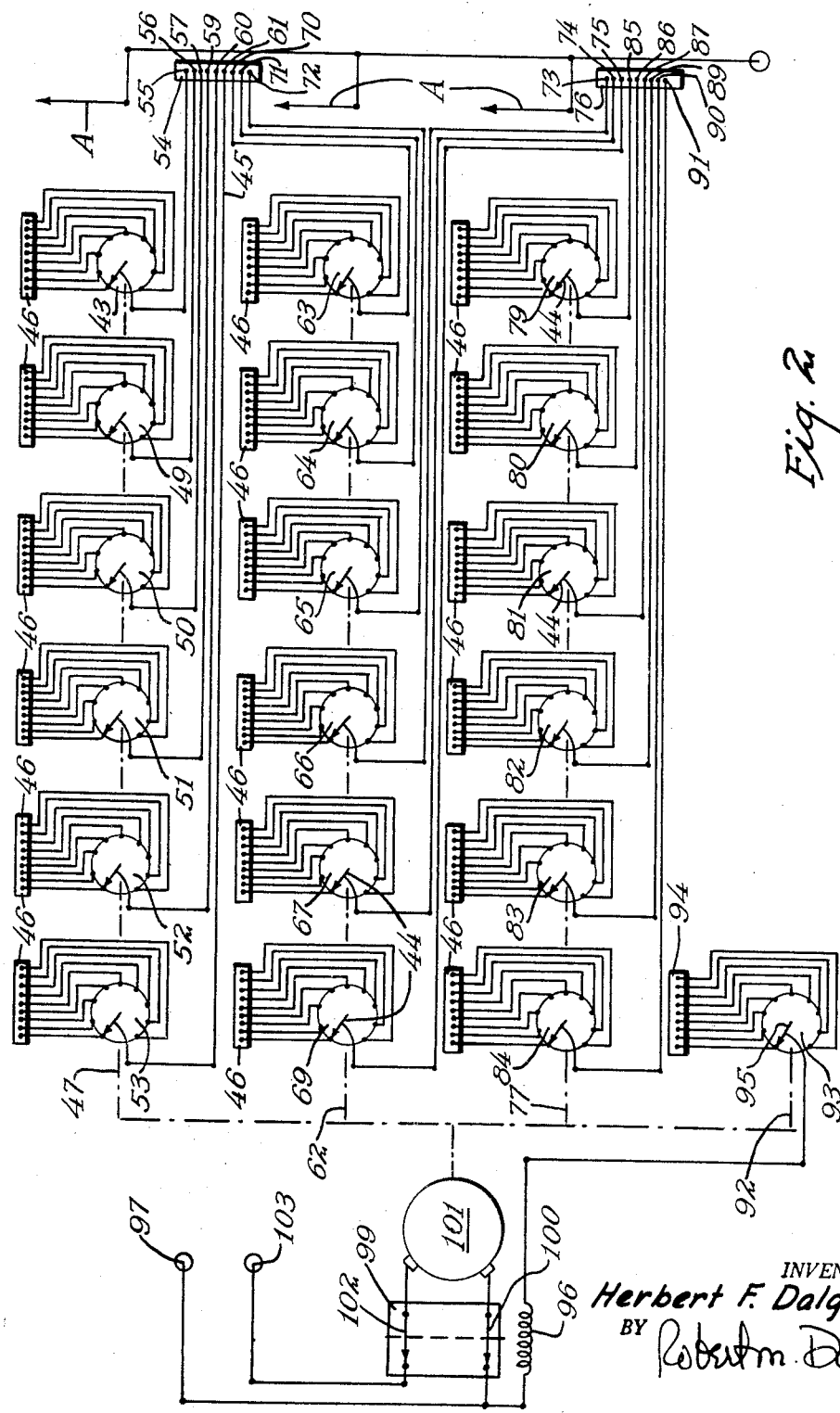
Figure 2 is a diagrammatic view of one remote control unit showing the arrangement of parts therein.

The motor control circuits controlling the various remote control units have been discussed in the description of Figure 2. In this figure one line wire is indicated at 97 and no connection for this wire is shown. In Figure 1 of the drawings the line wire 97 will be shown leading from all of the remote control units to a current supply source which is indicated by a plug 146 which may be inserted into any current supply socket. The other terminal of the plug 146 is connected by a conductor 147 to the rotary arm 149 of a switch 150. This switch 150 is provided with successive contacts which lead in sequence to terminals of a terminal strip 151 which connects with similar terminals of the strip 94. In other words the first contact of switch 150 is in practice connected to the first contact of switch 93, the second contact of switch 150 is connected to the second contact of switch 93 and etc. through the series of contacts.

Conductor 147 also leads through a relay armature coil 152 to a conductor 153 leading to the rotatable switch arm 154 of a switch 155 which is mounted for rotation in unison with rotary switches 125 and 145. A first pair of contacts on switch 155 are connected by conductor 156 to conductor 103 of the first remote control unit 17. A second pair of switch contacts on switch 155 are connected by conductor 157 to the power wire 103 of the second remote control unit 19. A third pair of contacts on switch 155 are connected by a conductor 159 to the power wire 103 of the third remote control unit 20. A fourth pair of contacts are connected by conductor 160 to the power wire 103 of the fourth remote control unit 21.

The armature coil 152 is provided for actuating a normally open switch blade 161 in a circuit between the power terminals including a signal light 162 for the purpose of indicating when the power is turned on. Any suitable switch may be used to control the entire circuit system.

The operation of the apparatus will now be described. The circuit is set into operation by connecting the plug 146 with a suitable current supply or closing a power switch to accomplish this result. Let us consider that it is desired to test the temperature at each terminal of the first thermocouple circuit connected to the first remote control unit 17. The rotary arms of the switches 125, 145 and 155 are turned to the first contact. This acts through switch 125 to connect in circuit the rotary arm 123 of the first rotary switch 111. The switch 145 simultaneously connects the common Constantan wire A of the first remote control unit 17 to the indicator 143, the other terminal of which is connected through switch 125 to switch 111. The switch 155 also simultaneously connects the power supply to the motor 101 of the first remote control unit 17.

The rotary arm of switch 111 is next shifted to its first position, thus connecting the selector switch 43 in the indicator circuit. The rotary arms of the switches 112, 113 and 114 may be simultaneously rotated without causing difficulty as the circuits to these remaining three switches are open.

The rotary arm 149 of the switch 150 is next turned to its first position closing a circuit to the first contact of switch 93. As the circuit to the motor 101 of remote control unit 17 is normally closed, the motor 101 will rotate until the rotating blade 95 contacts the first contact of the switch. Current then flows through the relay armature coil 96 energizing this coil and opening the motor circuit.

When the switches are in this position, current from the first thermocouple intersection 23 will flow through the system to the indicator 143 and the temperature at the thermocouple junction 23 may be read.

The selector switch arm 149 of the switch 150 is next turned to the second position. The disconnection of the switch arm from the first contact will open the circuit to the first contact of switch 93, breaking the circuit to the relay coil 96 and allowing the normally closed switch 99 to close. The motor 101 will then rotate the rotary switch 93 until the arm 95 engages the second contact at which time the relay coil 96 will again be energized. Once again the motor circuit will be broken and will remain broken until the selector switch 150 is again turned.

It will be seen that by rotating the arm 149 of the selector switch 150 successively from one contact point to the next, each of the thermocouple junctions in the first thermocouple circuit may be read by means of the indicator 143. It is also obvious that by rotating the arm of the selector switch to a neutral position, the circuits through switch 93 will remain open and the motor 101 will successively connect each thermocouple junction to the indicator so that if desired a quick scanning of the entire circuit may be obtained. It will also be obvious that the temperature of any thermocouple junction may be quickly obtained by turning the selector switch to the proper position until the motor circuit is broken. This is important as in this way certain areas which appear to have a somewhat higher temperature than is proper might easily be individually checked.

After the readings for the first thermocouple circuit have been obtained the arm 123 of the switch 111 is rotated to connect the second rotary switch 149 in the indicator circuit. The temperatures at each of the junctions at the second thermocouple circuit can be obtained by proper manipulation of the switch 150. When all of the circuits connected to the first selector switch 111 have been read, the arm 124 of switch 125 is rotated to its second position, connecting the switch 112 in the indicator circuit. By rotating the arm 126 of the second switch 112, and by manipulation of the selector switch 150, the temperature at each junction of each thermocouple circuit of the remainder of the remote control unit 17 may be read and noted.

By rotating the arm of switch 125 together with the arms of the switches 145 and 155, the indicator may be successively connected to the remote control units 19, 20 and 21 and the temperature at each junction of each thermocouple circuit may be obtained.

It will be seen that a great number of readings can be readily obtained through the use of a relatively small number of conductors between the remote control units and the selector units. If each thermocouple of the system were connected to the central station, there would be a tremendous number of conductors employed and the weight of such a cable would in itself comprise some problem. At the same time it permits the temperature at any junction to be determined from a central location so that the duplication of test instruments and the movement from one station to another to take readings is obviated.

In Figure 6 is disclosed an arrangement very similar to that shown in Figure 2 and which involves a series of thermocouple circuits identical to those of Figure 2 and identified by similar numbers. The only difference between this arrangement and the arrangement of Figure 2 lies in the selector system which controls the operation of the motor 101.

In the arrangement of Figure 6 a rotary switch 164 is provided having a rotary disc 165 of conductive material having an insulation segment 166 therein at one point of its periphery. The conductive disc 165 is connected by a conductor 167 to one terminal of the motor 101 while a second conductor 169 is connected to the common power wire or to one side of the plug 146 in the same manner as the conductor 97. The other side of the plug 146 is connected by a conductor 170 to the rotary arm 149 of the selector switch 150.

The successive contacts of the switch 150 are connected to a terminal strip 171 and the successive similar contacts of switch 164 are connected to a terminal strip 172 which is identical with the terminal strip 94 and connects with the terminal strip 171. In other words similarly located contacts of selector switch 150 are connected to similarly located contacts of switch 164.

When the device is in operation, the selector switch 150 is rotated to any position such as the first position. The circuit to the motor 101 will then be closed until the disc 165 rotates the insulation segment 166 against the first contact thus breaking the circuit to the motor. If the selector switch 150 is rotated until the arm 149 energizes the second contact of this switch, the motor circuit will again be closed until the insulation segment 166 energizes the second contact of switch 164. Obviously the contacts of switch 164 must be wiping contacts so as to maintain the motor circuit closed until a certain position of the switch is reached.

This latter arrangement has the advantage of eliminating the relay 99 and merely requires a different type of switch for its operation.

In the claims the switch 165 has been considered to be similar to the switch 93 for the purpose of simplicity this switch 165 being considered as having a switch arm and a series of contacts with which the arm engages. Actually, the arm of switch 165 would probably comprise the insulation segment which breaks the circuit rather than makes it. However, the two are considered broadly equivalent although each has its advantages over the other.

The various rotary switches are shown with a conductor leading to the switch arm. In actual practice, the rotary arm includes a rotary blade which is in constant communication with a collector ring, or a collector ring on the rotary switch arm shaft contacts a fixed brush. As these arrangements are common practice, the structure has not been shown in detail.

In certain of the claims the rotary switches which control individual thermocouple circuits will be described as distributing switches or distributor switches in order to differentiate them from the selector switches of the selector unit.

In accordance with the patent statutes, I have described the principles of construction and operation of my remote control units and while I have endeavored to set forth the best embodiment thereof, I desire to have it understood that obvious changes may be made within the scope of the following claims without departing from the spirit of my invention.

I claim:

1. A remote control system for controlling thermocouple circuits, the system including a remote control unit and a selector unit, the remote control unit including a series of distributor switches and a control switch, said distributor switches having switch arms mounted for rotation in unison, said control switch having a rotatable disc including an insulation segment, said selector unit including a selector switch, each of said switches including a similar number of angularly spaced contacts with which said arms and said insulation segment are successively engaged, a series of thermocouple circuits connected to said remote control unit each including a common wire and a series of individual wires connected to said common wire which are at points spaced along said common wire, said individual wires of each circuit being connected to the contacts of a corresponding distributor switch, a drive means for rotating the arms of said distributor switches and the disc of said control switch, a circuit to said drive means including the arm of said selector switch, the disc of said control switch and a source of power, an indicator in said selector unit capable of providing an indication of current flow, a second selector switch in said selector unit having a switch arm and a series of contacts successively engaged by said switch arm, means connecting the contacts of said second selector switch to corresponding switch arms of said distributor switches, a circuit to said indicator including the switch arm of said second selector switch, the switch arm of a selected distributor switch, an individual thermocouple wire, the common thermocouple wire and a means connecting the common thermocouple wire to said indicator.

2. The system described in claim 1 and including a third selector switch in said selector unit, and a second remote control system secured to said selector unit in parallel to said first selector unit, the remote control unit connected to said selector unit being controlled by said third selector switch.

3. A remote control system for controlling thermocouple circuits, the system including a plurality of remote control units and a selector unit, each remote control unit including a plurality of distributor switches and a control switch, each of said switches including a series of angularly spaced contacts and rotatable means selectively engageable with said contacts to control the circuit thereto, a series of thermocouple circuits each including a common conductor and a series of individual conductors connected to the common conductor at longitudinally spaced points on said common conductor, said individual conductors each being connected to the contacts of a corresponding distributor switch, a selector switch in said selector unit having a rotatable member and a series of contacts with which said member is selectively engageable to form contact therewith, the spaced contacts of said selector switch being similar in number and corresponding to the contacts of said control switch, conductors connecting corresponding contacts of said control switch and said selector switch, a drive means for rotating the control switch and distributor switches of each remote control unit, a circuit to each said drive means controlled by said control switch said control switch acting to break the circuit to said drive means when the position of its rotatable member corresponds to the position of the rotatable member of the selector switch, a second selector switch in said selector unit for each remote control unit, an indicator in said selector unit capable of indicating current flow, each said second selector switch including a switch arm and a series of angularly spaced contacts with which said switch arm may be selectively engaged, means connecting each contact of each said second selector switch to the rotatable member of a corresponding distributor switch, an indicating circuit including a third selector switch connecting said indicator to the switch arm of a selected second indicator switch, the indicator circuit also including the switch arm of a selected distributor switch, a selected individual conductor, said common conductor, and means connecting said common conductor to said indicator.

4. The construction described in claim 3 and including a fourth selector switch in said selector unit and controlling the means connecting the common conductors to the indicator, said fourth selector switch selectively connecting the common conductors connected to any of said remote control units to said indicator.

5. The construction described in claim 4 and including a fourth selector switch in said selector unit controlling the circuit to the drive means to selectively connect the drive means of any remote control unit to the power supply.

6. The construction described in claim 5 and including a fifth selector switch in said selector unit capable of controlling the circuit to the drive means of the remote control units so as to selectively connect any of said drive means to said power supply.

7. A remote control system for controlling thermocouple circuits, the system including a remote control unit and a selector unit, the remote control unit including a series of distributor switches and a control switch connected for operation in unison, each of said switches including a series of contacts and a switch arm movably supported for successively engaging said contacts substantially in unison, a series of thermocouple systems each including a common conductor and a series of individual conductors connected to said common conductor at spaced points, the individual conductors of each thermocouple system being connected to the contacts of a corresponding distributor switch of said remote control unit, an electrically operable drive means connected to said switches for operating the same, said selector unit including a selector switch having a series of contacts similar in number to the contacts of said control switch, conductors connecting corresponding contacts of said control switch to the contacts of said selector switch, a circuit to said operating means for actuating the same and including a source of power supply and the switch arms of said selector switch and said control switch, the movement of the switch arm of said selector switch to a selected contact closing the circuit to said operating means to operate said control switch and said distributor switches to a corresponding position, an indicator at said selector unit, a second selector switch in said selector unit having a series of angularly spaced contacts each connected to the arm of a corresponding distributor switch, said second selector switch including an arm selectively engageable with its spaced contacts and connected to said indicator, a circuit to said indicator including said common conductors, one of said individual conductors, the arm of said second selector switch, and the switch arm of a distributor switch.

8. A remote control system for controlling a series of thermocouple circuits, the system including a remote control unit and a selector unit, the remote control unit including a series of distributor switches and a control switch connected for operation in unison, said selector unit including a selector switch, all of said switches having a series of successive contacts and a contact arm capable of successively engaging said contacts, the contacts being similar in number, electrically operated means in said remote control unit connected to said control switch and said distributor switches for operating the same in unison, a series of thermocouple circuits connected to said remote control unit, each said circuit including a common conductor and a series of individual conductors connected to said common conductor at spaced points thereon, a circuit to said operating means including a normally closed relay switch, a relay armature in said relay switch operable when actuated to open said switch, conductors connecting the corresponding contacts of said control switch and said selector switch, and a circuit to said armature coil including the switch arms of said selector switch and said control switch, a source of power in both said circuits, an indicator at said selector unit for indicating current flow, a selector switch having a switch arm connected to said indicator and a series of contacts which may be selectively engaged by said last named switch arm and each of which is connected to the switch arm of a corresponding distributor switch, and a connection between said common conductors and said indicator.

9. The construction described in claim 7 and in which the circuit to said operating means includes a normally opened relay switch and in which the circuit through the control switch and the selector switch is connected to said relay switch to actuate said relay.

References Cited in the file of this patent

UNITED STATES PATENTS

| | | |
|---|---|---|
| 1,443,165 | Brown | Jan. 23, 1923 |
| 1,496,101 | Schmitt | June 3, 1924 |
| 2,074,066 | Wheeler | Mar. 16, 1937 |
| 2,113,348 | Hutchingson | Apr. 5, 1938 |
| 2,453,911 | Herr | Nov. 16, 1948 |
| 2,472,536 | Keil et al. | June 7, 1949 |
| 2,504,931 | Knudsen | Apr. 18, 1950 |
| 2,564,294 | Belcher | Aug. 14, 1951 |
| 2,682,652 | Grace | June 29, 1954 |